(12) United States Patent
Chiba

(10) Patent No.: US 6,362,119 B1
(45) Date of Patent: Mar. 26, 2002

(54) BARIUM BOROSILICATE GLASS AND GLASS CERAMIC COMPOSITION

(75) Inventor: Jiro Chiba, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 35 days.

(21) Appl. No.: 09/583,745

(22) Filed: May 31, 2000

(30) Foreign Application Priority Data

Jun. 9, 1999 (JP) .......................................... 11-162913

(51) Int. Cl.[7] .......................... C03C 8/14; C03C 14/00; C03C 3/064
(52) U.S. Cl. ............................ 501/15; 501/17; 501/32; 501/77; 501/78; 501/79
(58) Field of Search ............................. 501/15, 17, 32, 501/77, 78, 79

(56) References Cited

U.S. PATENT DOCUMENTS

| 4,537,703 A |   | 8/1985 | Hormadaly |
|---|---|---|---|
| 5,998,037 A | * | 12/1999 | Sridharan et al. ............. 501/78 |
| 6,124,224 A | * | 9/2000 | Sridharan et al. ............. 501/78 |

FOREIGN PATENT DOCUMENTS

| GB | 2 107 302 |   | 4/1983 |
|---|---|---|---|
| JP | 53-26810 | * | 3/1978 |
| RU | 1497166 | * | 7/1989 |

* cited by examiner

Primary Examiner—Karl Group
(74) Attorney, Agent, or Firm—Oblon, Spivak, McClelland, Maier & Neustadt, P.C.

(57) ABSTRACT

A barium borosilicate glass which consists essentially of, as represented by mass% based on the following oxides:

| $B_2O_3$ | 5 to 35%, |
|---|---|
| $SiO_2$ | 0.5 to 30%, |
| BaO | 25 to 75%, |
| $Al_2O_3$ | 0.5 to 13%, |
| $SnO_2$ | 0 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%. |

20 Claims, No Drawings

BARIUM BOROSILICATE GLASS AND GLASS CERAMIC COMPOSITION

BACKGROUND OF THE INVENTION

1. Field of the Invention

The present invention relates to a barium borosilicate glass and a glass ceramic composition useful for insulating pastes for electronic parts, ceramic color pastes for automobile windows, glazes for dishes and the like.

2. Discussion of Background

A glass powder or a glass ceramic composition containing a glass powder is widely used for e.g. insulating pastes for electronic parts and ceramic color pastes for automobile windows. Hereinafter, the glass powder and the glass ceramic composition will be referred to as a glass frit.

A glass frit for the above applications is required to have various properties, and various glass frits are used depending upon the properties required. For example, a glass frit containing lead, bismuth or cadmium has been conventionally used as a glass frit having excellent water resistance and acid resistance and capable of being fired at a temperature of from 600 to 850° C.

In recent years, as a glass frit having such properties, one containing no lead, bismuth nor cadmium has been required.

SUMMARY OF THE INVENTION

It is an object of the present invention to provide a glass and a glass ceramic composition containing no lead, bismuth nor cadmium, and having a softening point and a thermal expansion coefficient suitable for various applications, particularly for an application wherein a chemical durability such as water resistance is required and the firing temperature is from 600 to 850° C.

The present invention provides a barium borosilicate glass which consists essentially of, as represented by wt %:

| | |
|---|---|
| $B_2O_3$ | 5 to 35%, |
| $SiO_2$ | 0.5 to 30%, |
| BaO | 25 to 75%, |
| $Al_2O_3$ | 0.5 to 13%, |
| $SnO_2$ | 0 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%, | and a glass ceramic composition which comprises, as represented by mass%, from 50 to 99.9% of a powder of said barium borosilicate glass, from 0 to 50% of a ceramic filler and from 0 to 30% of a heat resistant pigment, wherein the total content of the ceramic filler and the heat resistant pigment is from 0.1 to 50%.

DETAILED DESCRIPTION OF THE PREFERRED EMBODIMENTS

The barium borosilicate glass of the present invention (hereinafter referred to simply as the glass of the present invention) is usually formed into a powder, followed by coating and firing to obtain a sintered product, and used as a powder.

The powder of the glass of the present invention may be kneaded with a vehicle containing a resin component such as ethyl cellulose and a solvent such as α-terpineol to obtain a paste, which is used for e.g. screen printing. Otherwise, it may be formed into a slurry, which is then formed into a green sheet, and a multi-layer construction may be prepared by using said green sheet. Here, the multi-layer construction may, for example, be prepared in such a manner that e.g. an electronic circuit pattern is formed on the green sheet by e.g. screen printing, and the resulting green sheets are laminated, followed by firing.

The powder of the glass of the present invention is useful for e.g. insulating pastes for electronic parts, materials for sealing electronic parts, color pastes for automobile windows and glazes for dishes. Examples of the insulating pastes for electronic parts include overcoat pastes for hybrid IC (HIC), crossover pastes for HIC, multi-layer insulating glass pastes for HIC and overcoat pastes for print heads.

The glass of the present invention has a softening point $(T_S)$ i.e. a softening point by a differential thermal analysis of preferably from 600 to 800° C. If it is less than 600° C., softening flow tends to be too significant during firing at a temperature of from 600 to 850° C., even if e.g. a ceramic filler is used together. It is more preferably at least 630° C., particularly preferably at least 650° C. If it exceeds 800° C., softening flow tends to be too small during firing at a temperature of from 600 to 850° C. It is more preferably at most 770° C., particularly preferably at most 750° C.

It is preferred that the glass of the present invention is less likely to undergo crystallization during firing. Namely, the glass of the present invention has a crystallization temperature $(T_C)$ of preferably at least 950° C., or a difference between $T_C$ and $T_S$ $(T_C-T_S)$ of preferably at least 50° C. $(T_C-T_S)$ is more preferably at least 100° C., particularly preferably at least 130° C. Here, $T_C$ is a crystallization peak temperature obtained by a differential thermal analysis, and in a case where no crystallization peak is confirmed even if the differential thermal analysis is carried out up to 1,000° C., $T_C$ is assumed to be infinite ($\infty$).

The average coefficient of linear expansion of the glass of the present invention at a temperature of from 50 to 350° C., i.e. the above average coefficient of linear expansion of the sintered product of the powder of the glass of the present invention, is preferably from $55 \times 10^{-7}$ to $100 \times 10^{-7}$/° C. If it is less than $55 \times 10^{-7}$/° C., expansion coefficient matching with e.g. an AlN substrate having the above average coefficient of linear expansion of, for example, $45 \times 10^{-7}$/° C., tends to be difficult, whereby application in which coating on e.g. an AlN substrate and firing are carried out, tends to be difficult. If it exceeds $100 \times 10^{-7}$/° C., expansion coefficient matching with e.g. soda lime silica glass having the above average coefficient of linear expansion of, for example, $78 \times 10^{-7}$/° C., tends to be difficult, even if e.g. a filler is used together, whereby application in which coating on e.g. a soda lime silica glass and firing are carried out, tends to be difficult. It is more preferably at most $85 \times 10^{-7}$/° C. Hereafter the average coefficient of linear expansion at a temperature of from 50 to 350° C. will be referred to simply as expansion coefficient.

The glass of the present invention preferably consists essentially of, as represented by mass% based on the following oxides:

| | |
|---|---|
| $B_2O_3$ | 5 to 35%, |
| $SiO_2$ | 0.5 to 30%, |

-continued

| | |
|---|---|
| BaO | 25 to 75%, |
| $Al_2O_3$ | 0.5 to 13%, |
| $SnO_2$ | 0.2 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%. |

Now, the composition of the glass of the present invention will be described below, representing by mass%.

$B_2O_3$ is a network former and essential. If it is less than 5%, the softening point tends to be too high. It is preferably at least 7%, more preferably at least 8%. If it exceeds 35%, the chemical durability, particularly water resistance, will decrease. It is preferably at most 33%.

$SiO_2$ is a network former and essential. If it is less than 0.5%, the chemical durability, particularly water resistance, will decrease. It is preferably at least 0.7%, more preferably at least 5%, particularly preferably at least 6%. If it exceeds 30%, the softening point tends to be too high. It is preferably at most 28%, more preferably at most 26%.

The total of contents of $B_2O_3$ and $SiO_2$ is preferably at most 49%, more preferably at most 47%.

BaO is a flux component and essential. If it is less than 25%, the softening point tends to be too high. It is preferably at least 27%, more preferably at least 28%. If it exceeds 75%, the glass tends to be devitrified during melting. It is preferably at most 73%, more preferably at most 71%.

$Al_2O_3$ is an essential component to increase the chemical durability, particularly water resistance and/or acid resistance, and to suppress crystallization during firing. If it is less than 0.5%, its effect, i.e. the effect of increasing the chemical durability or the effect of suppressing crystallization during firing, tends to be too small. It is preferably at least 0.7%, more preferably at least 1%. If it exceeds 13%, the glass tends to be devitrified during melting. It is preferably at most 11%, more preferably at most 10%, particularly preferably at most 6%.

$SnO_2$ is not essential, but has an effect of increasing the chemical durability, particularly water resistance, and may be contained up to 2%. If it exceeds 2%, no higher effect tends to be obtained any more, or the glass tends to be devitrified during melting. It is preferably at most 1.8%, more preferably at most 1.5%, particularly preferably at most 1%. In the case where $SnO_2$ is contained, the content is preferably at least 0.2%. If it less than 0.2%, the above effect tends to be too small. It is more preferably at least 0.4%, particularly preferably at least 0.5%.

$CeO_2$ is not essential, but may be contained up to 2% as an oxidizing agent. If it exceeds 2%, no higher effect tends to be obtained any more. It is preferably at most 1.8%, particularly preferably at most 1%.

Each of MgO, CaO and SrO is not essential, but may be contained up to 10% in total, in order to adjust the expansion coefficient. If it exceeds 10%, no higher effect tends to be obtained any more. It is preferably at most 9%.

ZnO is not essential, but may be contained up to 20% as a flux component. If it exceeds 20%, the glass tends to be devitrified during melting. It is preferably at most 18%.

Each of $TiO_2$ and $ZrO_2$ is not essential, but may be contained up to 5% each, in order to increase the chemical durability. If it exceeds 5%, the glass tends to be devitrified during melting. It is preferably at most 3% each, more preferably at most 2% each.

Each of $Li_2O$, $Na_2O$ and $K_2O$ is not essential, but may be contained up to 5% each as a flux component. If it exceeds 5%, the expansion coefficient tends to be too high. It is preferably at most 4% each.

The glass of the present invention consists essentially of the above components, but may contain other components within a range of not impairing the object of the present invention. The total of contents of said other components is preferably at most 10%, more preferably at most 5%. Examples of said other components include a coloring component such as $Fe_2O_3$.

Here, NiO is a coloring component, but if it is contained in an amount exceeding 5%, the glass tends to be devitrified during melting, and thus the content is preferably at most 1%. It is more preferred that no NiO is contained substantially, i.e. its content is not higher than the impurity level.

Further, the glass of the present invention contains no lead, bismuth nor cadmium in an amount exceeding the impurity levels.

The glass ceramic composition of the present invention is fired to obtain a sintered product.

Now, the glass ceramic composition of the present invention will be described below, representing by mass%.

The powder of the glass of the present invention is an essential component. If it is less than 50%, the sintering degree, i.e. the denseness of the sintered product, will decrease. It is preferably at least 70%. The average particle size of the powder of the glass of the present invention is preferably from 0.5 to 10 $\mu$m.

Either a ceramic filler or a heat resistant pigment is essential. If the total content of the ceramic filler and the heat resistant pigment is less than 0.1%, the effect by containing the ceramic filler and/or the heat resistant pigment is too small. If it exceeds 50%, the content of the powder of the glass of the present invention tends to be too small.

The ceramic filler is a component to adjust the expansion coefficient of the sintered product, and may be contained up to 50%. If it exceeds 50%, the sintering degree tends to decrease. It is preferably at most 30%.

The ceramic filler contains no lead, bismuth nor cadmium.

Examples of the ceramic filler include α-alumina, α-quartz, cordierite, stabilized zirconia, magnesia, forsterite, steatite, zircon and β-eucryptite. The heat resistant pigment is a coloring component, and may be contained up to 30%. If it exceeds 30%, the sintering degree tends to decrease. It is preferably at most 20%.

The heat resistant pigment contains no lead, bismuth -nor cadmium. Examples of the heat resistant pigment include a Cu-Cr-Mn-O type heat resistant black pigment, a Cu-Cr-O type heat resistant black pigment, a Co-V-Fe-O type heat resistant violet pigment, a Cr-O type heat resistant green pigment and a Co-O type heat resistant green pigment.

The glass ceramic composition of the present invention consists essentially of the above components, but may contain other components such as a powder of a glass other than the glass of the present invention, within a range of not impairing the object of the present invention. The total content of said other components is preferably at most 20%, more preferably at most 10%.

The sintered product of the glass ceramic composition of the present invention has a softening point by a differential thermal analysis of preferably from 600 to 800° C.

The sintered product of the glass ceramic composition of the present invention has an expansion coefficient of preferably from $40\times10^{-7}$ to $100\times10^{-7}$ /° C.

The glass ceramic composition of the present invention may be kneaded with a vehicle containing a resin component such as ethyl cellulose and a solvent such as α-terpineol to obtain a paste, which is used for e.g. screen printing. Otherwise, it may be formed into a slurry, which is then formed into a green sheet, and a multi-layer construction may be prepared by using said green sheet. Here, the multi-layer construction may, for example, be prepared in such a manner that e.g. an electronic circuit pattern is formed on the green sheet by e.g. screen printing, and the resulting green sheets are laminated, followed by firing.

The glass ceramic composition of the present invention is suitable for e.g. insulating pastes for electronic parts, materials for sealing electronic parts, ceramic color pastes for automobile windows and glazes for dishes. Examples of the insulating pastes for electronic parts include overcoat pastes for hybrid IC (HIC), crossover pastes for HIC, multi-layer insulating glass pastes for HIC and overcoat pastes for print heads.

Now, the present invention will be described in further detail with reference to Examples. However, it should be understood that the present invention is by no means restricted to such specific Examples.

EXAMPLE

Starting materials were blended so that the composition was as shown in columns "$B_2O_3$" to "PbO" in each Table as represented by mass%, and put into a crucible made of e.g. platinum and melted at a temperature of from 1,200 to 1,500° C. for from 2 to 3 hours. The obtained glass was formed into flakes by water granulation or by pouring into stainless steel rollers, followed by pulverization in a pulverizer such as an alumina ball mill, to obtain a glass powder having an average particle size of from 0.5 to 10 μm.

With respect to this glass powder, the transition point $T_G$ (unit: ° C.), the softening point $T_S$ (unit: ° C.), the crystallization temperature $T_C$ (unit: ° C.) and the expansion coefficient α (unit: $\times 10^{-7}$ /° C.) were measured as described hereinafter.

The above glass powder, a ceramic filler and a heat resistant pigment were blended and mixed so that their contents were as shown in each Table as represented by mass%, to obtain a glass ceramic compression of each of Examples 1 to 9. Examples 1 to 7 represent Working Examples of the present invention, and Examples 8 and 9 represent Comparative Examples.

As the ceramic filler, α-alumina (α-AL), α-quartz (α-Q), cordierite (CO), stabilized zirconia (SZ), magnesia (MG), forsterite (FO), zircon (ZR) or β-eucryptite (β-EU) was used.

As the heat resistant pigment, a Cu-Cr-Mn-O type heat resistant black pigment, a Cu-Cr-O type heat resistant black pigment, a Co-V-Fe-O type heat resistant violet pigment, a Cr-O type heat resistant green pigment or a Co-O type heat resistant green pigment was used. With respect to the above glass ceramic composition, the transition point $T_g'$ (unit: ° C.), the softening point $T_S'$ (unit: ° C.), the crystallization temperature $T_C'$ (unit: ° C.), the expansion coefficient α' (unit: $\times 10^{-7}$ /° C.) and the sintering degree were measured or evaluated as described below.

$T_G$, $T_S$, $T_C$, $T_G'$, $T_S'$ and $T_C'$: Using a sample powder, a differential thermal analysis was carried out by raising the temperature to 1,000° C. at a temperature raising rate of 10° C./min.

$T_G$, $T_S$, $T_g'$ and $T_S'$ were measured by a method similar to one which has been conventionally employed in the case where the sample powder is a glass powder. $T_g'$ is preferably from 530 to 600° C., and $T_S'$ is preferably from 640 to 750° C.

With respect to $T_C$ and $T_C'$, when an exothermic peak at a temperature higher than $T_S$ or $T_S'$ was confirmed, the peak temperature of said exothermic peak was taken as $T_C$ or $T_C'$. When the exothermic peak was not confirmed, $T_C$ or $T_C'$ was evaluatd to be infinite (∞).

α and α': A sample powder was pressed into a rod having an appropriate size, and the rod was subjected to firing at a temperature of from 600 to 850° C., followed by polishing to obtain a cylindrical sample having a diameter of 5 mm and a length of from 15 to 20 mm. With respect to said sample, the elongation was measured by heating it at a temperature raising rate of 10° C./min by a thermodilatometer, and the average coefficient of linear expansion at a temperature of from 50 to 350° C. was calculated. α' is preferably from $50\times10^{-7}$ to $90\times10^{-7}$/° C.

Sintering degree: A sample powder was subjected to firing at 800° C. or 700° C. to prepare a sintered product. Then, said sintered product was immersed in a water-soluble red ink for 5 minutes, and the red ink adhered to the surface of the sintered product was removed by running water. The sintered product thus obtained was observed and inspected if the red ink was infiltrated into the sintered product. The symbol "○" in each Table represents a case where the red ink was not infiltrated thereinto, and the symbol "X" represents a case where it was. With respect to the sintered product obtained by firing at 800° C., it is preferred that the red ink was not infiltrated thereinto.

TABLE 1

|  | Example 1 | Example 2 | Example 3 |
|---|---|---|---|
| Glass powder content | 70 | 70 | 95 |
| $B_2O_3$ | 33 | 30 | 30 |
| $SiO_2$ | 9 | 16.5 | 6 |
| BaO | 28 | 33 | 35 |
| $Al_2O_3$ | 2 | 1 | 10 |
| $SnO_2$ | 1 | 0.5 | 1 |
| MgO | 0 | 3 | 0 |
| CaO | 5 | 0 | 0 |
| SrO | 4 | 0 | 1 |
| ZnO | 17 | 15 | 15 |
| $TiO_2$ | 1 | 0 | 2 |
| $ZrO_2$ | 0 | 1 | 0 |
| PbO | 0 | 0 | 0 |
| $T_G$ | 565 | 575 | 580 |
| $T_S$ | 660 | 670 | 675 |
| $T_C$ | ∞ | ∞ | ∞ |
| α | 73 | 69 | 73 |
| Filler content | 30 | 25 | 3 |
| Filler | α-AL | ZR | FO |
| Heat resistant pigment content | 0 | 5 | 2 |
| Heat resistant pigment |  | Cu—Cr—Mn—O | Cu—Cr—Mn—O |
| $T_G'$ | 580 | 590 | 595 |
| $T_S'$ | 730 | 745 | 690 |
| $T_C'$ | 900 | 890 | ∞ |
| α' | 65 | 58 | 67 |
| Sintering degree (800° C.) | ○ | ○ | ○ |
| Sintering degree (700° C.) | × | × | ○ |

TABLE 2

| | Example 4 | Example 5 | Example 6 |
|---|---|---|---|
| Glass powder content | 70 | 85 | 88 |
| $B_2O_3$ | 28 | 22 | 8 |
| $SiO_2$ | 15.5 | 10 | 26 |
| BaO | 40 | 50 | 56 |
| $Al_2O_3$ | 5 | 4 | 1 |
| $SnO_2$ | 0.5 | 1 | 1 |
| $CeO_2$ | 1 | 0 | 0 |
| ZnO | 8 | 8 | 0 |
| $Li_2O$ | 0 | 3 | 1 |
| $Na_2O$ | 2 | 1 | 3 |
| $K_2O$ | 0 | 1 | 4 |
| PbO | 0 | 0 | 0 |
| $T_G$ | 570 | 540 | 590 |
| $T_S$ | 690 | 660 | 705 |
| $T_C$ | ∞ | ∞ | ∞ |
| α | 79 | 80 | 87 |
| Filler content | 10 | 10 | 10 |
| Filler | MG | SZ | α-Q |
| Heat resistant pigment content | 20 | 5 | 2 |
| Heat resistant pigment | Cu—Cr—O | Co—V—Fe—O | Cr—O |
| $T_G'$ | 570 | 540 | 590 |
| $T_S'$ | 710 | 670 | 710 |
| $T_C'$ | ∞ | ∞ | ∞ |
| α' | 85 | 78 | 70 |
| Sintering degree (800° C.) | ○ | ○ | ○ |
| Sintering degree (700° C.) | × | ○ | × |

TABLE 3

| | Example 7 | Example 8 | Example 9 |
|---|---|---|---|
| Glass powder content | 85 | 83 | 65 |
| $B_2O_3$ | 10 | 15 | 10 |
| $SiO_2$ | 8 | 30 | 30 |
| BaO | 71 | 0 | 0 |
| $Al_2O_3$ | 5.5 | 4 | 2 |
| $SnO_2$ | 1 | 0 | 0 |
| $CeO_2$ | 0.5 | 0 | 0 |
| CaO | 0 | 5 | 3 |
| ZnO | 0 | 10 | 0 |
| $TiO_2$ | 0 | 2 | 2 |
| $Li_2O$ | 0 | 2 | 0 |
| $Na_2O$ | 4 | 2 | 0 |
| $K_2O$ | 1 | 0 | 0 |
| PbO | 0 | 30 | 53 |
| $T_G$ | 530 | 520 | 450 |
| $T_S$ | 640 | 650 | 590 |
| $T_C$ | ∞ | ∞ | ∞ |
| α | 100 | 58 | 62 |
| Filler content | 13 | 15 | 10 |
| Filler | β-EU | α-AL | α-AL |
| Heat resistant pigment content | 2 | 2 | 25 |
| Heat resistant pigment | Co—O | Cu—Cr—Mn—O | Cu—Cr—Mn—O |
| $T_G'$ | 540 | 540 | 445 |
| $T_S'$ | 650 | 690 | 625 |
| $T_C'$ | ∞ | ∞ | 710 |
| α' | 80 | 70 | 80 |
| Sintering degree (800° C.) | ○ | ○ | ○ |
| Sintering degree (700° C.) | ○ | ○ | ○ |

According to the present invention, a barium borosilicate glass and a glass ceramic composition containing no lead, bismuth nor cadmium, and uesful for e.g. Insulating pastes for electronic parts, ceramic color pastes for automobile windows and glazes for dishes, will be obtained.

What is claimed is:

1. A barium borosilicate glass which consists essentially of, as represented by mass% based on the following oxides:

| | |
|---|---|
| $B_2O_3$ | 5 to 35%, |
| $SiO_2$ | 0.5 to 30%, |
| BaO | 25 to 75%, |
| $Al_2O_3$ | 0.5 to 13%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%, | wherein the $SnO_2$ content is from 0.2 to 2%.

2. The barium borosilicate glass according to claim 1, wherein the total of the $B_2O_3$ content and the $SiO_2$ content as represented by mass% is at most 49%.

3. The barium borosilicate glass according to claim 1, which has a softening point of from 600 to 800° C.

4. A glass ceramic composition which comprises, as represented by mass%, from 50 to 99.9% of a powder of the barium borosilicate glass which consists essentially of, as represented by mass% based on the following oxides:

| | |
|---|---|
| $B_2O_3$ | 5 to 35%, |
| $SiO_2$ | 0.5 to 30%, |
| BaO | 25 to 75%, |
| $Al_2O_3$ | 0.5 to 13%, |
| $SnO_2$ | 0 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%, | from 0 to 50% of a ceramic filler, and from 0 to 30% of a heat resistant pigment, wherein the total content of the ceramic filler and the heat resistant pigment is from 0.1 to 50%.

5. The glass ceramic composition according to claim 4, wherein the powder of the barium borosilicate glass has an average particle size of from 0.5 to 10 μm.

6. The glass ceramic composition according to claim 4, wherein the ceramic filler is at least one member selected from the group consisting of α-alumina, α-quartz, cordierite, stabilized zirconia, magnesia, forsterite, steatite, zircon and β-eucryptite.

7. The glass ceramic composition according to claim 4, wherein the heat resistant pigment is at least one member selected from the group consisting of a heat resistant black pigment, a heat resistant violet pigment, a heat resistant green pigment and a heat resistant blue pigment.

8. The glass ceramic composition according to claim 4, having from 0.5 to 16.5% $SiO_2$.

9. The glass ceramic composition according to claim 8, wherein the ceramic filler is at least one member selected from the group consisting of α-alumina, α-quartz, cordierite, stabilized zirconia, magnesia, forsterite, steatite, zircon and β-eucryptite.

10. The glass ceramic composition according to claim 8, wherein the heat resistant pigment is at least one member selected from the group consisting of a heat resistant black pigment, a heat resistant violet pigment, a heat resistant green pigment and a heat resistant blue pigment.

11. The glass ceramic composition according to claim 4, having from 0.2 to 2% $SnO_2$.

12. The glass ceramic composition according to claim 11, wherein the ceramic filler is at least one member selected from the group consisting of α-alumina, α-quartz, cordierite, stabilized zirconia, magnesia, forsterite, steatite, zircon and β-eucryptite.

13. The glass ceramic composition according to claim 11, wherein the heat resistant pigment is at least one member selected from the group consisting of a heat resistant black pigment, a heat resistant violet pigment, a heat resistant green pigment and a heat resistant blue pigment.

14. A barium borosilicate glass which consists essentially of, as represented by mass% based on the following oxides:

| | |
|---|---|
| $B_2O_3$ | 5 to 35%, |
| $SiO_2$ | 0.5 to 16.5%, |
| BaO | 25 to 75%, |
| $Al_2O_3$ | 0.5 to 13%, |
| $SnO_2$ | 0 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%. |

15. The barium borosilicate glass according to claim 14, wherein the $SnO_2$ content as represented by mass% is from 0.2 to 2%.

16. The barium borosilicate glass according to claim 14, wherein the total of the $B_2O_3$ content and the $SiO_2$ content as represented by mass% is at most 49%.

17. The barium borosilicate glass according to claim 14, which has a softening point of from 600 to 800° C.

18. A glass ceramic composition which comprises, as represented by mass%, from 50 to 99.9% of a powder of the barium borosilicate glass which consists essentially of, as represented by mass% based on the following oxides:

| | |
|---|---|
| $B_2O_3$ | 5 to 35%, |
| $SiO_2$ | 0.5 to 16.5%, |
| BaO | 25 to 75%, |
| $Al_2O_3$ | 0.5 to 13%, |
| $SnO_2$ | 0 to 2%, |
| $CeO_2$ | 0 to 2%, |
| MgO + CaO + SrO | 0 to 10%, |
| ZnO | 0 to 20%, |
| $TiO_2$ | 0 to 5%, |
| $ZrO_2$ | 0 to 5%, |
| $Li_2O$ | 0 to 5%, |
| $Na_2O$ | 0 to 5%, and |
| $K_2O$ | 0 to 5%, | from 0 to 50% of a ceramic filler, and from 0 to 30% of a heat resistant pigment, wherein the total content of the ceramic filler and the heat resistant pigment is from 0.1 to 50%.

19. The glass ceramic composition according to claim 18, wherein the ceramic filler is at least one member selected from the group consisting of α-alumina, α-quartz, cordierite, stabilized zirconia, magnesia, forsterite, steatite, zircon and β-eucryptite.

20. The glass ceramic composition according to claim 18, wherein the heat resistant pigment is at least one member selected from the group consisting of a heat resistant black pigment, a heat resistant violet pigment, a heat resistant green pigment and a heat resistant blue pigment.

* * * * *